US008684438B2

(12) United States Patent
Stanik et al.

(10) Patent No.: US 8,684,438 B2
(45) Date of Patent: Apr. 1, 2014

(54) BRACE FOR THE OUTER SKIN REINFORCEMENT FOR A SHEET METAL OUTER SKIN OF A MOTOR VEHICLE

(71) Applicant: GM Global Technology Operations LLC, Detroit, MI (US)

(72) Inventors: Stefan Stanik, Bruchkoebel (DE); Carl-Adolf Kimmes, Mainz-Laubenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/745,201

(22) Filed: Jan. 18, 2013

(65) Prior Publication Data

US 2013/0193718 A1 Aug. 1, 2013

(30) Foreign Application Priority Data

Jan. 19, 2012 (DE) ........................ 10 2012 001 025

(51) Int. Cl.
*B62D 25/20* (2006.01)

(52) U.S. Cl.
USPC .... 296/30; 296/209; 296/146.15; 296/187.12

(58) Field of Classification Search
USPC ......... 296/186.1, 187.12, 30, 187.11, 193.05, 296/193.08, 209, 146.15
See application file for complete search history.

(56) References Cited

U.S. PATENT DOCUMENTS

| | | | | |
|---|---|---|---|---|
| 5,027,570 | A | 7/1991 | Mitchell et al. | |
| 5,553,910 | A * | 9/1996 | Park | 296/187.12 |
| 2008/0054675 | A1 | 3/2008 | Moroishi | |
| 2010/0000180 | A1 | 1/2010 | Uto et al. | |

FOREIGN PATENT DOCUMENTS

| | | | |
|---|---|---|---|
| CN | 202038370 | U | 11/2011 |
| DE | 3730757 | A1 | 3/1989 |
| DE | 19833398 | A1 | 2/2000 |
| DE | 10007421 | A1 | 8/2001 |
| DE | 10337007 | A1 | 3/2005 |
| DE | 10348354 | A1 | 6/2005 |
| DE | 102012009386 | A1 | 12/2012 |
| JP | 2001151145 | A | 6/2001 |
| JP | 2008189066 | A | 8/2008 |

OTHER PUBLICATIONS

German Patent Office, German Search Report for Application No. 10 2012 001 025.7 dated Sep. 11, 2012.

UK IPO, British Search Report for Application No. 1301000.4, dated May 2, 2013.

* cited by examiner

*Primary Examiner* — Joseph Pape
(74) *Attorney, Agent, or Firm* — Ingrassia Fisher & Lorenz, P.C.

(57) ABSTRACT

Disclosed is an outer skin reinforcement for an outer skin of a motor vehicle, wherein the outer skin reinforcement is formed of a brace, which extends parallel to the outer skin and is connected on connecting points in the vehicle in a rotationally fixed manner, wherein the brace is connected to the outer skin via an adhesive layer.

6 Claims, 1 Drawing Sheet

1 4 6 10 10 15 14 3 5 11 8 15 10 14 9 7 2

BRACE FOR THE OUTER SKIN REINFORCEMENT FOR A SHEET METAL OUTER SKIN OF A MOTOR VEHICLE

CROSS-REFERENCE TO RELATED APPLICATION

This application claims priority to German Patent Application No. 102012001025.7, filed Jan. 19, 2012, which is incorporated herein by reference in its entirety.

TECHNICAL FIELD

The technical field relates to an outer skin reinforcement for an outer skin of a motor vehicle.

BACKGROUND

The outer skin of vehicles can be a sheet metal layer and can be less than 0.7 mm thick. Because of a relatively high stiffness and the low mass, the outer skin can have natural frequencies which lie in the audible range. In the case of larger areas, the outer skin can be additionally pressed in and dented relatively easily.

An outer skin reinforcement is known from DE 37 30 757 A1. Therein it is proposed to arrange an inner structure of two plastic layers on an inside of the outer skin, wherein the plastic layers are separated by spacers subject to the formation of intermediate spaces. The two plastic layers contact each other in marginal regions of the outer skin and are enclosed by the outer skin through a flanging.

It is at least one object herein to provide an outer skin reinforcement for a motor vehicle that can be assembled with little effort. In addition, other objects, desirable features and characteristics will become apparent from the subsequent summary and detailed description, and the appended claims, taken in conjunction with the accompanying drawings and this background.

SUMMARY

In an exemplary embodiment, an outer skin reinforcement for an outer skin of a motor vehicle is formed from a brace. The brace extends parallel to the outer skin and is arranged on connecting points in the vehicle in a rotationally fixed manner. The brace is connected to the outer skin via an adhesive layer.

Through the adhesive layer, the outer skin is non-positively held fixed through the adhesive layer in both directions located orthogonally to the outer skin. The outer skin is thus fixed in regions, so that it cannot oscillate there. In addition, the brace brings about that the outer skin cannot be dented.

In an embodiment, the brace is formed from a sheet metal part, which in cross section forms a U-shaped section and two straight sections extending out of the U-shaped section.

The U-shaped section per se is already relatively torsionally rigid in its longitudinal axis. The straight sections increase the stiffness relative to torsional forces. A brace formed in such a manner can be produced in a deep-drawing process, as a result of which the production costs can be kept low.

In another embodiment, the brace supports the outer skin in a middle region, wherein the middle region is equally spaced from outer boundaries of the outer skin.

A non-fixed outer skin has the greatest possible oscillation amplitude in the middle region. In that the outer skin is especially fixed in the middle region, a reduction of the noise development can already be achieved.

According to a further embodiment, the adhesive layer is tough-elastic.

The adhesive layer can thus act in a damping manner so that oscillations that develop are dissipated rapidly.

According to another embodiment, the outer skin is a side part of a two-door motor vehicle.

In particular two-door motor vehicles have relatively large areal outer skin parts between the entrance doors and the rear wheel housings that have to be supported. With substantial weight saving compared to an areal plastic supporting, a supporting via a brace in this case can prevent a denting of the outer skin.

According to a further embodiment, the connecting points of the brace are arranged on a sill and a lower side of a window frame.

A brace attached to almost non-yielding body elements achieves an effective oscillation suppression. It has been shown that the brace is optimally supported on the window frame and the sill.

According to an embodiment, the connecting points are spot welds.

Spot welds can be applied in the production process in an automated manner. Thus, an operation for providing the connecting points is no longer necessary. Because of this, the costs for producing the outer skin support can be kept low.

BRIEF DESCRIPTION OF THE DRAWINGS

The various embodiments will hereinafter be described in conjunction with the following drawing figures, wherein like numerals denote like elements, and wherein:

FIG. 1 illustrates from an inside view a side part of a motor vehicle with a sill and a window frame and a brace running in between.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
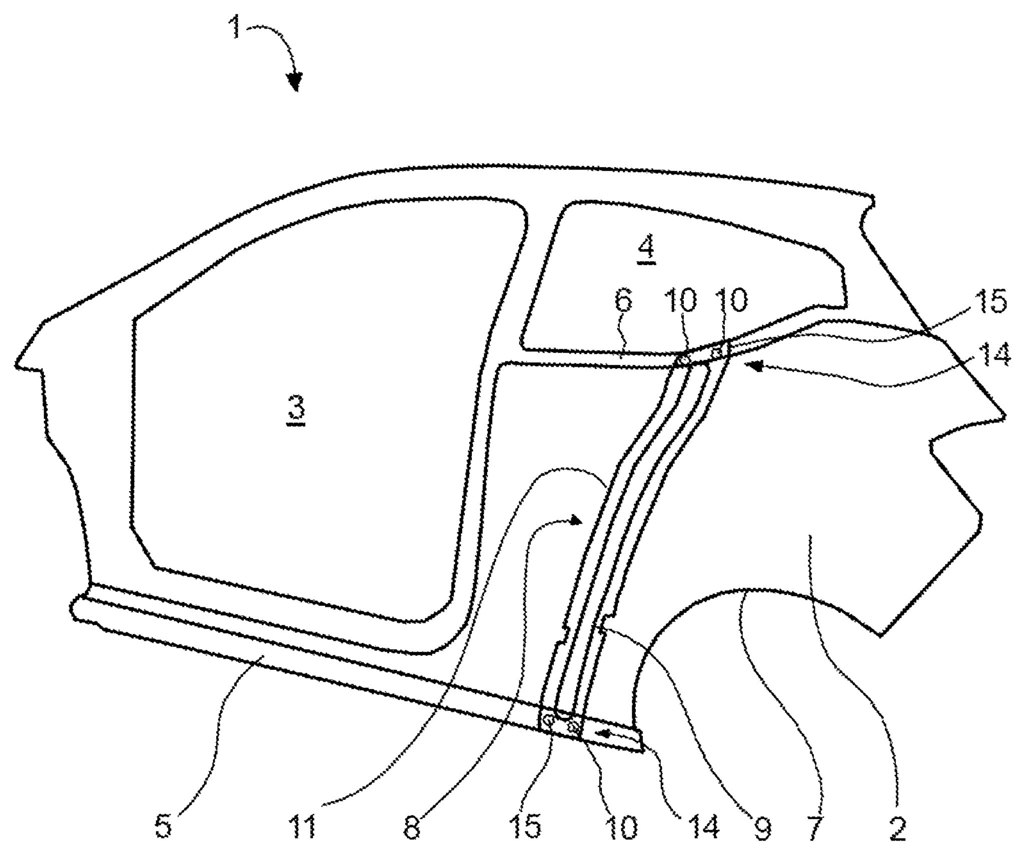

FIG. 1 shows a side part 1 of a motor vehicle which is not otherwise shown from an inside view. The side part 1 is formed from an outer skin 2, which can consist of a steel panel or of an aluminum panel. The side part 1 comprises a door portal 3 for a door that is not otherwise shown, a window frame 4 and a sill 5. The sill 5 can be connected to an underfloor assembly and further components so that the sill 5 in the assembled state is substantially non-yielding and solid. The window frame 4 has a lower side 6. Owing to a folded region facing to the inside and running parallel to the lower side 6 the lower side 6 is likewise sturdy. The sturdiness of the lower side 6 is further increased when the window pane and the fastening elements surrounding the latter are arranged in the window frame 4.

In the region between the door portal 3 and a wheel housing 7, the outer skin 2 is supported by an outer skin reinforcement 8, according to an exemplary embodiment. The outer skin reinforcement 8 is formed of a brace 9. The brace 9 can be formed of a deep-drawn sheet metal part or of plastic, for example, consisting of fiber-reinforced plastic. The brace 9 is fastened to the sill 5 and to the lower side 6 of the window frame 4 on connecting points 10. The connecting points 10 can be stamped rivet connections, spot welds, clinch connections, screw connections, or the like. The outer skin reinforcement 8 supports the outer skin 2 in a middle region 11. Otherwise, the middle region 11 is the region of the shown outer skin 2 that can be dented mostly easily. In the middle region 11, substantial oscillation amplitudes can also be reached in the direction substantially facing orthogonally to the outer skin 2. The outer skin 2 then acts like a diaphragm, which, in particular when excited in a natural frequency range and higher orders, can generate airborne sound. This is prevented through the outer skin reinforcement 8 in that the brace 9 supports the outer skin 8.

Figure 2:
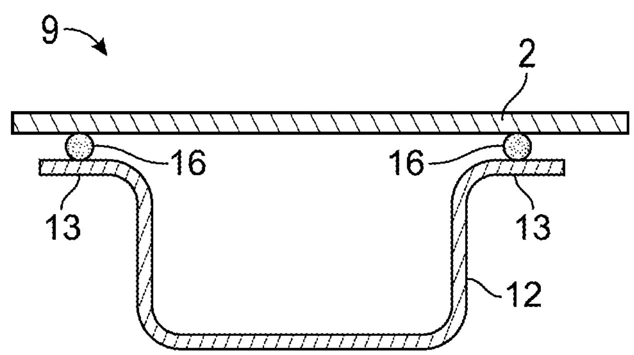
FIG. 2 is a cross sectional view through an outer skin reinforcement according to an exemplary embodiment, which comprises a brace and an adhesive layer connecting the brace to the outer skin.

In an embodiment, the brace 9 is formed of a substantially U-shaped section 12 and two straight sections 13 extending out of the U-shaped section, as illustrated in FIG. 2. The U-shaped region 12 per se ensures a high longitudinal stiffness. The straight sections 13 increase the torsional stiffness of the brace 9 in that they prevent that the U-shaped regions 12 can move towards or away from each other. On end regions 14, the brace 9 has flattened connecting surfaces 15, in which the connecting points 10 can be arranged. The connecting surfaces 15 areally bear against the sill 5 and the lower side 6.

In another embodiment, the brace 9 is connected to the outer skin 2 via an adhesive layer 16. The adhesive layer 16 is formed of a tough-elastic material, so that it additionally has a damping effect itself. Because of this, a tinny sound is avoided for example when slamming the door shut. A penetration of airborne sound from the outside into an interior of the motor vehicle is also suppressed through the adhesive layer 16. In FIG. 1, the brace 9 substantially extends perpendicularly. In the case of applications in which the sill 5 and the lower side 6 are orientated in a different way to one another than as shown in FIG. 1, diagonal or horizontally located braces 9 can also be practical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An outer skin reinforcement for an outer skin of a motor vehicle, the outer skin reinforcement comprising:

a brace that extends parallel to the outer skin, wherein the brace comprises connecting points for connecting to the motor vehicle in a rotationally fixed manner, and an adhesive layer that connects the brace to the outer skin, wherein the connecting points of the brace are arranged on a sill and a lower side of a window frame of the motor vehicle.

2. The outer skin reinforcement according to claim 1, wherein the brace is formed of a sheet metal part, which in cross section is configured as a U-shaped section and two straight sections extending out of the U-shaped section.

3. The outer skin reinforcement according to claim 1, wherein the brace supports the outer skin in a middle region of the outer skin, which is evenly spaced from outer boundaries of the outer skin.

4. The outer skin reinforcement according to claim 1, wherein the adhesive layer is tough-elastic.

5. The outer skin reinforcement according to claim 1, wherein the outer skin is a side part of a two-door motor vehicle.

6. The outer skin reinforcement according to claim 1, wherein the connecting points are spot welds.

* * * * *